United States Patent
Zapatylak et al.

(12)

(10) Patent No.: US 12,332,728 B2
(45) Date of Patent: Jun. 17, 2025

(54) FAILURE DETECTION OF POWER LOSS PROTECTION USING LIGHT CORE DUMP IN DATA STORAGE DEVICE

(71) Applicant: SK hynix Inc., Icheon-si (KR)

(72) Inventors: Aliaksandr Zapatylak, Minsk (BY); Aleksei Popov, Minsk (BY); Leonid Zaliubovskyi, Minsk (BY); Leanid Kavaliou, Minsk (BY)

(73) Assignee: SK HYNIX INC., Icheon-si (KR)

( * ) Notice: Subject to any disclaimer, the term of this patent is extended or adjusted under 35 U.S.C. 154(b) by 138 days.

(21) Appl. No.: 18/181,131

(22) Filed: Mar. 9, 2023

(65) Prior Publication Data

US 2024/0303192 A1    Sep. 12, 2024

(51) Int. Cl.
  *G06F 11/00* (2006.01)
  *G06F 11/07* (2006.01)
  *G06F 12/0804* (2016.01)

(52) U.S. Cl.
CPC ...... *G06F 11/0757* (2013.01); *G06F 11/0751* (2013.01); *G06F 12/0804* (2013.01); *G06F 2212/1032* (2013.01)

(58) Field of Classification Search
None
See application file for complete search history.

(56) References Cited

U.S. PATENT DOCUMENTS

| | | | |
|---|---|---|---|
| 9,170,941 B2 | 10/2015 | Ellis et al. | |
| 9,772,894 B2 | 9/2017 | Parnell et al. | |
| 10,346,072 B1* | 7/2019 | Peterson | G06F 1/28 |
| 10,521,305 B2* | 12/2019 | Delaney | G06F 11/3034 |
| 2024/0202081 A1* | 6/2024 | Oh | G06F 11/0793 |

OTHER PUBLICATIONS

Google Scholar/Patents search—text refined (Year: 2024).*
Google Scholar/Patents search—text refined (Year: 2025).*

* cited by examiner

*Primary Examiner* — Christopher S McCarthy
(74) *Attorney, Agent, or Firm* — Perkins Coie LLP

(57) ABSTRACT

Disclosed is a power loss protection method. In some implementations, the method includes initiating a timer to indicate a progress of a power loss protection procedure that performs a data transfer upon occurrence of a power loss interrupt event, initiating a first data transfer operation to transfer a first amount of data to a memory device, and upon an indication by the timer that the power loss protection procedure has reached a predetermined progress level, continuing the first data transfer operation until the first amount of data is transferred to the memory device, or upon an indication by the timer that the power loss protection procedure has failed to reach the predetermined progress level, discontinuing the first data transfer operation and performing a second data transfer operation to transfer a second amount of data to the memory device, wherein the second amount is less than the first amount.

19 Claims, 6 Drawing Sheets

FAILURE DETECTION OF POWER LOSS PROTECTION USING LIGHT CORE DUMP IN DATA STORAGE DEVICE

TECHNICAL FIELD

This patent document relates to semiconductor memories and data storages including the semiconductor memories.

BACKGROUND

Semiconductor-based data storage devices such as solid state drives (SSDs) are actively being used in computing systems, due to their improved performance and decreased mechanical reliability compared to hard disk drives (HDDs). A data storage device includes a controller and other hardware components in communication with the computing system via an interface protocol, and data storage elements in the SSD are connected to the controller and hardware components via a device interface. In addition, a variety of software components, operating systems, and firmware may be integrated into the data storage device.

SUMMARY

Embodiments of the disclosed technology relate to methods and systems that, among other features and benefits, can transfer data from a data storage device to a memory device upon occurrence of a power loss interrupt event.

In some embodiments of the disclosed technology, a power loss protection method for a data storage device includes initiating a timer to indicate a progress of a power loss protection procedure that performs a data transfer upon occurrence of a power loss interrupt event, initiating a first data transfer operation to transfer a first amount of data to a memory device, and upon an indication by the timer that the power loss protection procedure has reached a predetermined progress level, continuing the first data transfer operation until the first amount of data is transferred to the memory device, or upon an indication by the timer that the power loss protection procedure has failed to reach the predetermined progress level, discontinuing the first data transfer operation and performing a second data transfer operation to transfer a second amount of data to the memory device, wherein the second amount is less than the first amount.

In some embodiments of the disclosed technology, a data storage system includes a timer configured to indicate a progress of a power loss protection procedure that performs a data transfer upon occurrence of a power loss interrupt event, a power management controller core in communication with the timer to initiate the timer and generate a power loss interrupt message upon occurrence of the power loss interrupt event, a plurality of memory device firmware controller cores configured to perform a first data transfer operation to transfer a first amount of data to a memory device in response to the power loss interrupt message, and a host administrative controller core configured to: continue the first data transfer operation upon an indication by the timer that the power loss protection procedure has reached a predetermined progress level; or discontinue the first data transfer operation and perform a second data transfer operation to transfer a second amount of data to the memory device upon an indication by the timer that the power loss protection procedure has failed to reach the predetermined progress level, wherein the second amount is less than the first amount.

DETAILED DESCRIPTION

Figure 1:
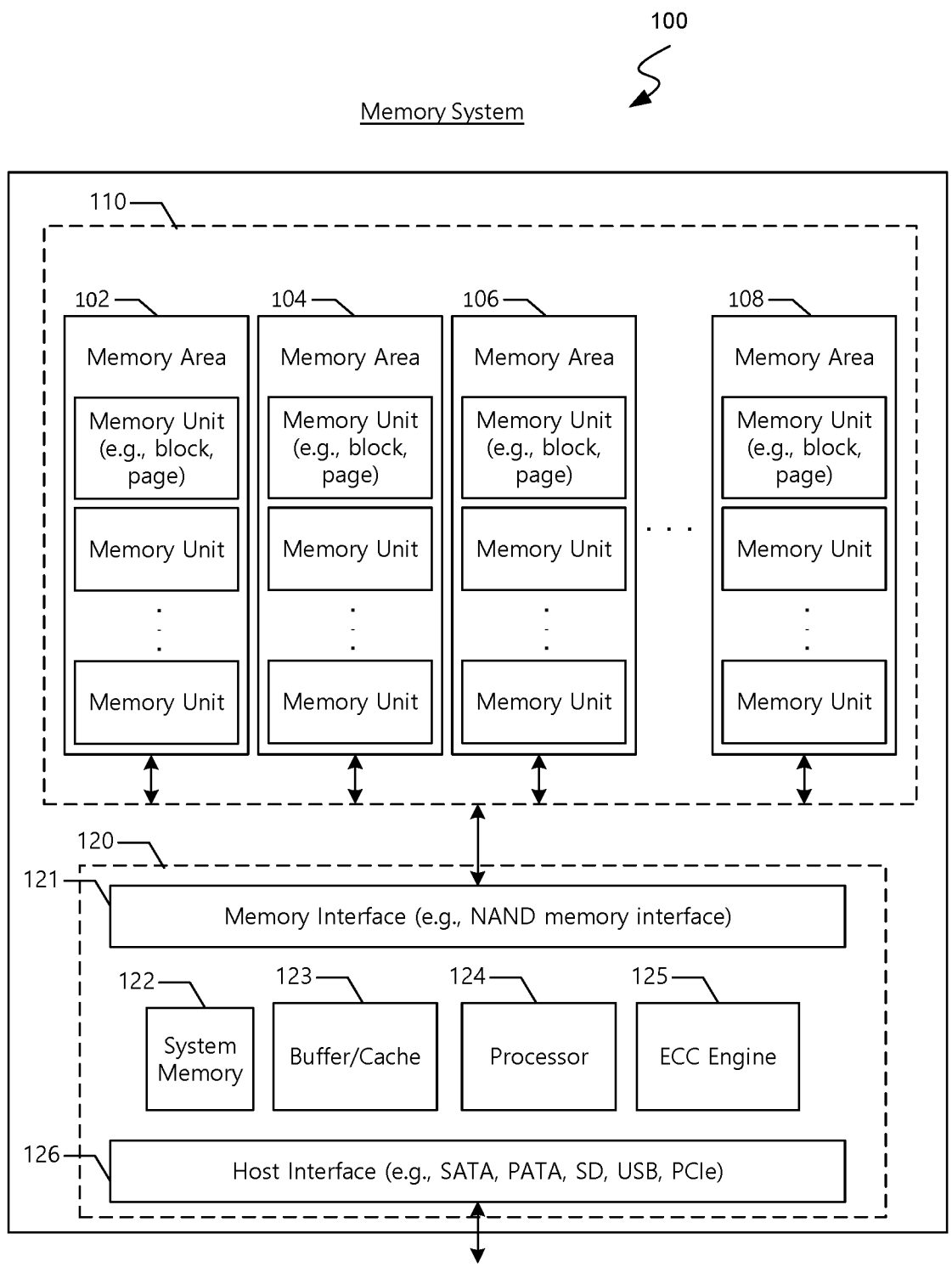
FIG. 1 illustrates an example of a memory system implemented based on some embodiments of the disclosed technology.

FIG. 1 illustrates an example of a memory system 100 implemented based on some embodiments of the disclosed technology. The memory system 100 includes a memory module 110 that can be used to store information for use by other electronic devices or systems. The memory system 100 can be incorporated (e.g., located on a circuit board) in other electronic devices and systems. Alternatively, the memory system 100 can be implemented as an external storage device such as a USB flash drive and a solid-state drive (SSD).

The memory module 110 included in the memory system 100 can include memory areas (e.g., memory arrays) 102, 104, 106, and 108. Each of the memory areas 102, 104, 106, and 108 can be included in a single memory die or in multiple memory dice. The memory die can be included in an integrated circuit (IC) chip.

Each of the memory areas 102, 104, 106, and 108 includes a plurality of memory cells. Read, program, or erase operations can be performed on a memory unit basis. Thus, each memory unit can include a predetermined number of memory cells. The memory cells in a memory area 102, 104, 106, or 108 can be included in a single memory die or in multiple memory dice.

The memory cells in each of memory areas 102, 104, 106, and 108 can be arranged in rows and columns in the memory units. Each of the memory units can be a physical unit. For example, a group of a plurality of memory cells can form a memory unit. Each of the memory units can also be a logical unit. For example, the memory unit can be a bank, block, or page that can be identified by a unique address such as bank address, block address, and page basis address. During a read or write operation, the unique address associated with a particular memory unit can be used to access that particular memory unit. Based on the unique address, information can be written to or retrieved from one or more memory cells in that particular memory unit.

The memory cells in the memory areas 102, 104, 106, and 108 can include non-volatile memory cells. Examples of non-volatile memory cells include flash memory cells, phase change memory (PRAM) cells, magnetoresistive random-access memory (MRAM) cells, or other types of non-volatile memory cells. In an example implementation where the memory cells are configured as NAND flash memory cells, the read or write operation can be performed on a page basis. However, an erase operation in a NAND flash memory is performed on a block basis.

Each of the non-volatile memory cells can be configured as a single-level cell (SLC) or multiple-level memory cell. A single-level cell can store one bit of information per cell. A multiple-level memory cell can store more than one bit of information per cell. For example, each of the memory cells in the memory areas 102, 104, 106, and 108 can be configured as a multi-level cell (MLC) to store two bits of information per cell, a triple-level cell (TLC) to store three bits of information per cell, or a quad-level cells (QLC) to store four bits of information per cell. In another example, each of the memory cells in memory area 111 can be configured to store at least one bit of information (e.g., one bit of information or multiple bits of information), and each of the memory cells in memory area 112 can be configured to store more than one bit of information.

As shown in FIG. 1, the memory system 100 includes a controller module 120. The controller module 120 includes a memory interface 121 to communicate with the memory module 110, a host interface 126 with communicate with a host (not shown), a processor 124 to executes firmware-level code, and caches and memories 122 and 123 to temporarily or persistently store executable firmware/instructions and associated information. In some implementations, the controller unit 120 can include an error correction engine 125 to perform error correction operation on information stored in the memory module 110. Error correction engine 122 can be configured to detect/correct single bit error or multiple bit errors. In another implementation, error correction engine 125 can be located in the memory module 110.

The host can be a device or a system that includes one or more processors that operate to retrieve data from the memory system 100 or store or write data into the memory system 100. In some implementations, examples of the host can include a personal computer (PC), a portable digital device, a digital camera, a digital multimedia player, a television, and a wireless communication device.

In some implementations, the controller module 120 can also include a host interface 126 to communicate with the host. Host interface 126 can include components that comply with at least one of host interface specifications, including but not limited to, Serial Advanced Technology Attachment (SATA), Serial Attached Small Computer System Interface (SAS) specification, Peripheral Component Interconnect Express (PCIe).

Figure 2:
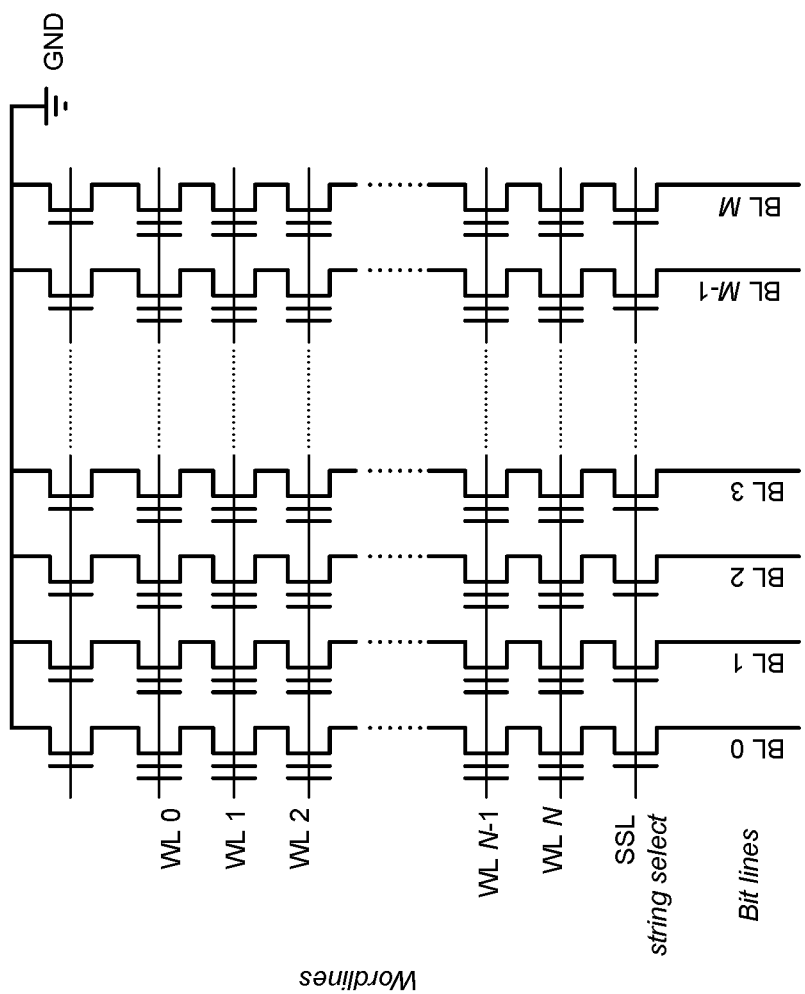
FIG. 2 illustrates an example of a memory cell array implemented based on some embodiments of the disclosed technology.

FIG. 2 illustrates an example of a memory cell array implemented based on some embodiments of the disclosed technology.

In some implementations, the memory cell array can include a NAND flash memory array that is partitioned into many blocks, and each block contains a certain number of pages. Each block includes a plurality of memory cell strings, and each memory cell string includes a plurality of memory cells.

In some implementations where the memory cell array is NAND flash memory array, read and write (program) operations are performed on a page basis, and erase operations are performed on a block basis. All the memory cells within the same block must be erased at the same time before performing a program operation on any page included in the block. In an implementation, NAND flash memories may use an even/odd bit-line structure. In another implementation, NAND flash memories may use an all-bit-line structure. In the even/odd bit-line structure, even and odd bit-lines are interleaved along each word-line and are alternatively accessed so that each pair of even and odd bit-lines can share peripheral circuits such as page buffers. In all-bit-line structure, all the bit-lines are accessed at the same time.

Data storage devices such as an enterprise solid state drive (SSD) may carry out a power loss protection (PLP); the firmware (FW), among others, is responsible for the procedures associated with the PLP. However, the procedures for the PLP may be relatively complex and there can be timing issues that are not easy to detect. Debugging such cases can be extremely difficult due to the difficulty of reproducing them. Existing mechanisms for collecting debug information are not suitable for this case. This type of the timing issues can also happen on the customer side, for which the vendor must provide a failure analysis report.

In order to tackle such problems, the data storage device can have a mechanism which can create a mini core dump for debugging purposes on the vendor side. The data storage device may not collect and save all the needed debug information if the issue happens during a sudden power loss (SPL). The main restriction is that PLP time is typically limited to about 10-40 ms depending on power consumption. Therefore, it is necessary to identify the failure condition as early as possible to have more time for the debug data.

In some embodiments of the disclosed technology, a power loss protection method for a data storage device may include: initiating a timer to indicate a progress of a power loss protection procedure that performs a data transfer upon occurrence of a power loss interrupt event; initiating a first data transfer operation to transfer a first amount of data to a memory device; and (1) upon an indication by the timer that the power loss protection procedure has reached a predetermined progress level, continuing the first data transfer operation until the first amount of data is transferred to the memory device (or the power is turned off), or (2) upon an indication by the timer that the power loss protection procedure has failed to reach the predetermined progress level, discontinuing the first data transfer operation and performing a second data transfer operation to transfer a second amount of data to the memory device, wherein the second amount is less than the first amount. In some implementations, transferring the second amount of data may be the mini core dump discussed above (or "light core dump" discussed below). In some implementations, the predetermined progress level may be "barrier of success" shown in FIGS. 3 and 4.

Figure 3:
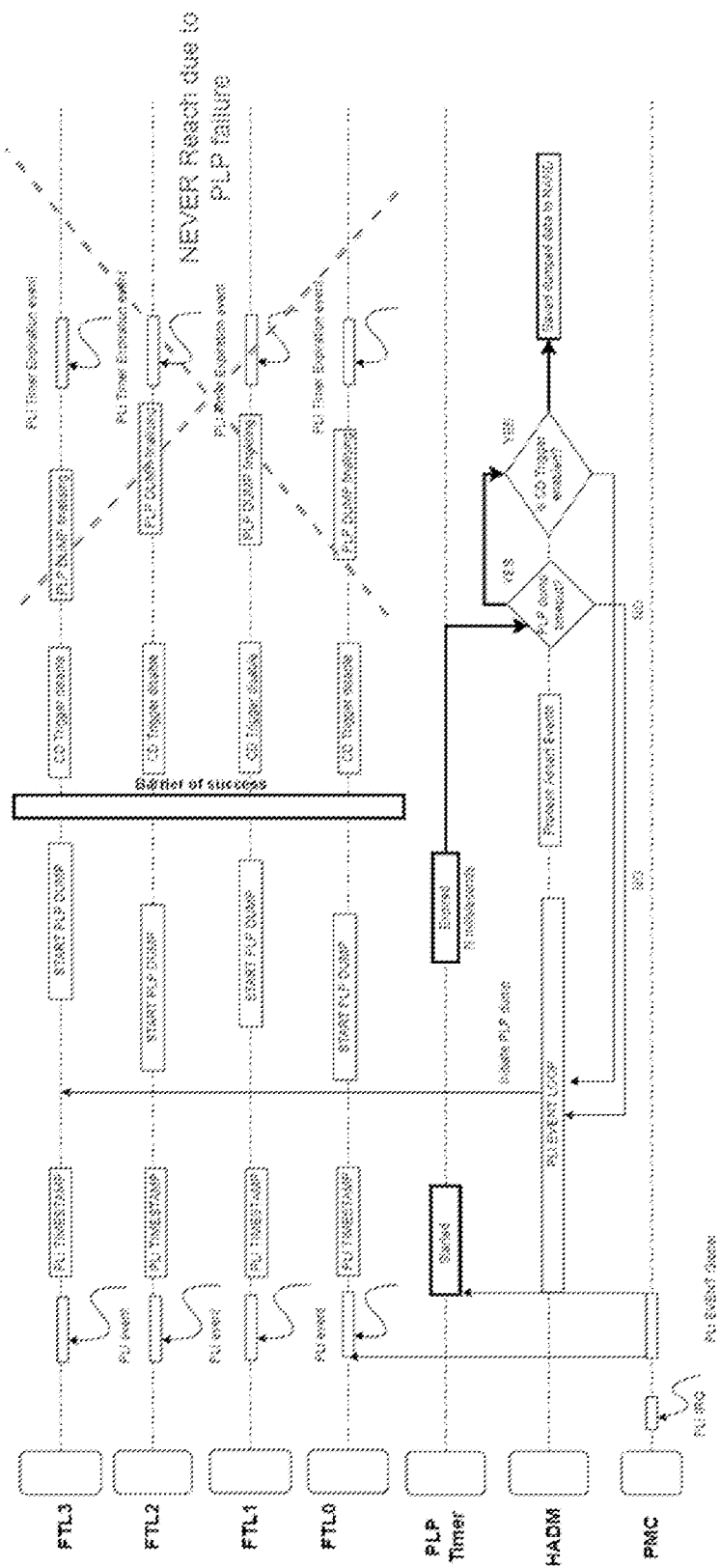
FIG. 3 shows an example timing diagram of a power loss protection failure detection based on some embodiments of the disclosed technology.
Figure 4:
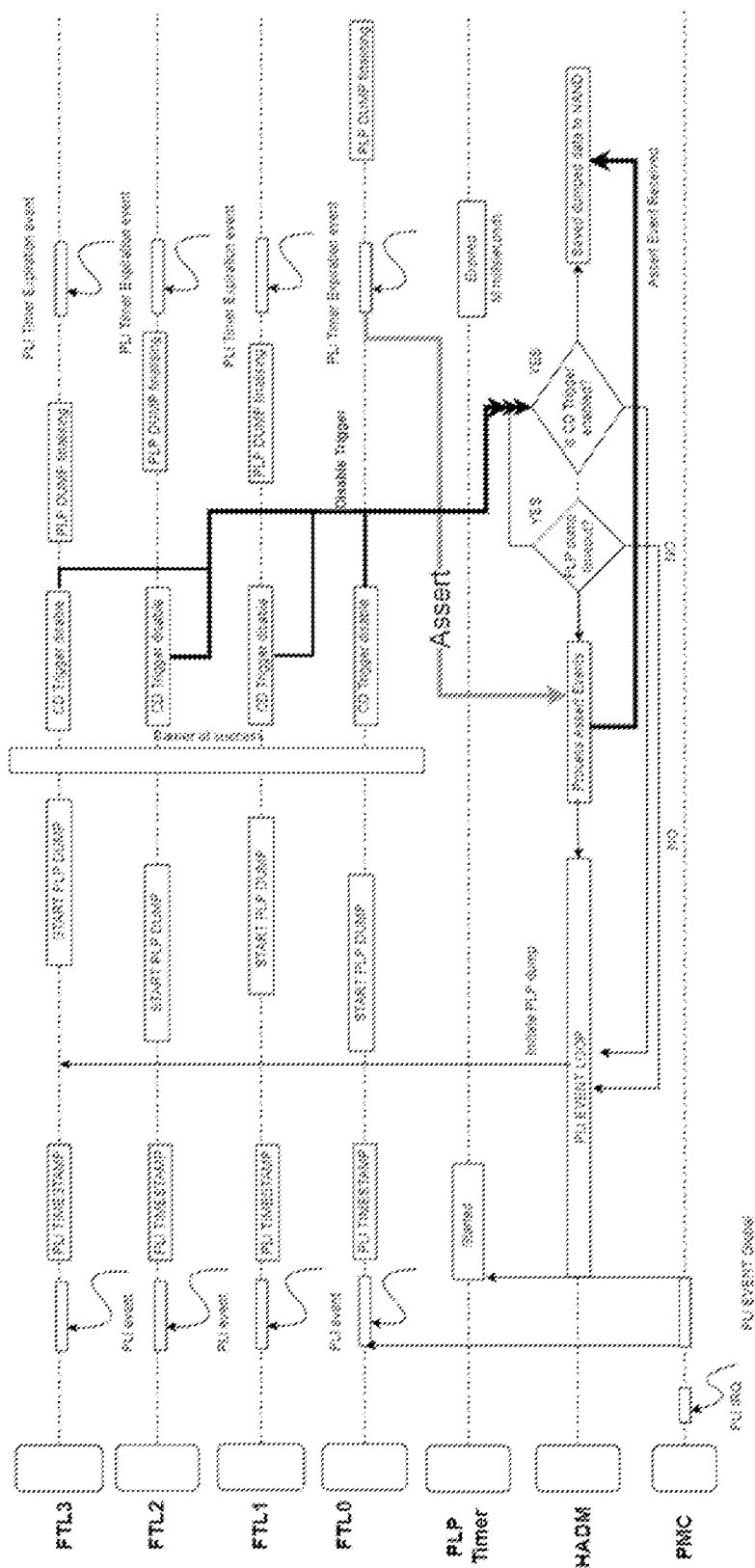
FIG. 4 shows another example timing diagram of a power loss protection failure detection based on some embodiments of the disclosed technology.

FIG. 3 shows an example timing diagram of a power loss protection failure detection based on some embodiments of the disclosed technology. FIG. 4 shows another example timing diagram of a power loss protection failure detection based on some embodiments of the disclosed technology.

Referring to FIGS. 3 and 4, a plurality of Flash Translation Layer (FTL) cores FTL0-FTL3 may be configured to control access from software into the specific memory regions. In some implementations, a power management core (PMC) is configured to (1) handle the interrupt from a power management integrated circuit (PMIC), which are integrated circuits that include multiple power rails and power monitoring and management functions within a single chip, and (2) distribute a message (e.g., message corresponding the interrupt request) to among all of the required CPU cores. In some implementations, a host admin (HADM) core is configured to enter a power loss interrupt (PLI) loop (e.g., PLI EVENT LOOP in FIGS. 3 and 4) in response to a message received from the PMC core, and then a PLP dump procedure is started (e.g., START PLP DUMP in FIGS. 3 and 4). In some implementations, the PLP dump procedure may performed to record portions of memory upon detection of a power loss interrupt (PLI).

In some implementations, upon occurrence of a power loss interrupt (PLI) event, each FTL core FTL0-FTL3 may generate a PLI time stamp (e.g., PLI TIMESTAMP in FIGS. 3 and 4). In one example, the PLI event indicates an event that is used for signaling to firmware (e.g., FTL) when a sudden power loss (SPL) has been detected.

The disclosed technology can be implemented in some embodiments to be applied to a PLP timer expiration that occurs before the barrier of success of all FCPU cores, as shown in FIG. 3. The disclosed technology can also be implemented in some embodiments to be applied to a FCPU PLP timer expiration on FCPU0 that occurs at some point during PLP dump procedure, as shown in FIG. 4.

In some implementations, as illustrated in FIG. 3, a power loss protection (PLP) failure can be detected by a Host Admin-power loss protection timer (HADM PLP timer). In a case that a PLP timer expiration occurs before the barrier of success of all FCPU cores, a power loss protection failure is detected and the PLP procedure that includes the PLP dump is not completed.

In some implementations, as illustrated in FIG. 4, a PLP failure can be detected by FCPU own timer measurement.

In some implementations of the disclosed technology, Host Admin (HADM) may be a processor core such as a regular Cortex-R8 core with a memory protection unit (MPU). In one example, the HADM processes a communication between a host system and the SSD, and a light core dump server is also executed on the HADM core.

In some implementations of the disclosed technology, FCPU0-FCPU3 may indicate Flash CPU. In one example, FCPU0-FCPU3 may indicate FTL0FTL3.

In some implementations of the disclosed technology, the PMC may be used for processing power related events, such as a sudden power loss event, configuring clock domains, etc.

In some implementations of the disclosed technology, a power loss protection (PLP) timer may indicate a general-purpose system level timer used to capture time stamps between CPU cores in a system on chip (e.g., Aquarius SoC), specifically used for power loss protection.

In some implementations of the disclosed technology, a memory protection unit (MPU) includes a computer hardware unit that provides memory protection. In some embodiments, the MPU may be implemented as part of the central processing unit (CPU). In some embodiments, MPU may be a trimmed down version of memory management unit (MMU) providing only memory protection support. In some embodiments, MPU may be implemented in low power processors that require only memory protection and do not need the full-fledged feature of memory management unit like virtual memory management.

In some implementations of the disclosed technology, core registers include ARM core registers. In one example, ARM core registers may include a set of 16 general registers that are used for its work and contain some service information as stack pointer, program counter, etc.

In some implementations of the disclosed technology, data tight coupled memory (DTCM) may include a memory that provides low-latency memory accesses that the core can use.

In some implementations of the disclosed technology, power management integrated circuits (PMICs) may indicate integrated circuits that include multiple power rails and power monitoring and management functions within a single chip.

In some implementations of the disclosed technology, sudden power loss (SPL) indicates the situation when the power supply to a data storage device (e.g., an external power from the host system) is interrupted.

In some implementations of the disclosed technology, power loss interrupt (PLI) indicates the event used for signaling to firmware when SPL has been detected.

A modern SSD controller may include a multicore system on chip (SoC), and a certain core in the multicore SoC has its own functional purpose. Normally, SoC has HADM core (NVMe commands processor) and FCPU cores (FTL). In some implementations, all these cores are involved in a PLP procedure and may potentially fail to reach a certain step of the PLP procedure. The most common root cause of PLP failure includes the firmware hang in an unknown location in the code, and thus it is the most useful part of debug information that firmware needs to save, as well as the call stacks of each of those cores. It is important to identify the place where firmware hangs. Each CPU core can start a timer (e.g., capture timestamp) and identify the window during which the communication is the most error-prone. It may be experimentally identified that the beginning of PLP procedure is the most vulnerable to bugs—it is the moment when each CPU has to interrupt its current activities and switch into PLP flush mode. In some implementations, firmware can only wait for 8 milliseconds of inactivity after which the procedure is considered to be failed and will not be able to complete. A safe barrier is introduced into PLP procedure after reaching a PLP procedure that is considered successful. It may however still fail, nevertheless the firmware will not have enough time to save the debug data during the remaining time.

In some implementations, a core dump is performed to record portions of memory upon detection of an error, such that the recorded portions of the memory may be analyzed to diagnose and debug the error.

In some implementations, a core dump indicates binary data that represents at least one of (1) CPU/SoC memory state at a certain moment (e.g., the moment of failure or some time before the failure), or (2) the execution state of each CPU including a call stack and general purpose registers. In some implementations, the core dump may include the recorded state of the working memory of a computer program at a specific time (e.g., when the program has terminated abnormally). In some implementations, the call stack can indicate a data stack structure that stores information about a computer program. The purpose of a binary data dump is to recreate the failure scene in the device and allow engineers to analyze and debug the state in order to find out the reason of failure. A set of scripts may be used to load and navigate through the failed firmware state in a simulation mode corresponding to a real device. In some implementations, the data dump can indicate a large amount of data that is moved or transferred from one computer system, file, or device to another.

In some embodiments of the disclosed technology, a light core dump is a small version of core dump that contains the most vital data or minimum data to save during PLP procedure, e.g., when there is enough energy to do it. In some implementations, the light core dump includes a data tight coupled memory (DTCM) memory area and CPU register file to identify the line of code executing and the context data around the failure.

In some embodiments of the disclosed technology, a power loss protection (PLP) procedure includes at least one of the following operations:

1. Interrupt request (e.g., PLI IRQ) is generated externally by a power management integrated circuit (PMIC) when the power supply is interrupted (PLP procedure in the firmware (FW) starts here);
2. Power management core (PMC) handles the interrupt from PMIC and distributes a message (e.g., message corresponding the interrupt request) to among all of the required CPU cores;
3. Host admin (HADM) core enters a power loss interrupt (PLI) loop in response to the message received from PMC core;
4. Flash CPU (FCPU) cores receive the message, switch the entire FW into a PLP mode, and begin a preparation procedure;
5. FCPU cores also start NAND command abort and reinitialization of hardware (HW) in order to prepare for PLP vital data dump;
6. FCPU cores perform PLP steps at different timings due to different amount of work required to do and different state before power loss happens;
7. HADM ensures all of the unnecessary HW is switched off, and new commands are not received;
8. HADM ensures that write atomicity is guaranteed by sending all the required messages to FCPU cores;
9. HADM saves SMART and other log pages;
10. HADM enables PLP dump on all FCPU cores (e.g., second step of PLP procedure);
11. HADM goes into the message waiting infinite loop;
12. FCPU completes PLP dump procedure and stalls until the device fully discharges and power goes off.

In some embodiments of the disclosed technology, a firmware PLP failure detection algorithm based on the light core dump may include at least one of the following operations:

1. PMC core handles PMIC interrupt and starts a timer in order to detect PLP dump entrance issues (e.g., when FCPU FW does not reach a certain point);
2. HADM goes into a message waiting infinite loop during which it monitors the time elapsed since the start of PLP procedure;
3. FCPU cores transmits signals to report, to HADM, whether PLP procedure has successfully reached a certain point (e.g., barrier of success in FIGS. 3 and 4);
4. In a case that HADM receives the signals from FCPU cores, the procedure (e.g., PLP procedure) is performed until the power is turned off (e.g., HADM does nothing);
5. In a case that HADM does not receive at least one signal from one of FCPU within N milliseconds timeout (e.g., N is a positive integer), HADM activates a light core dump saving procedure at this point;
6. Each FCPU has to maintain their own timestamp and estimate their own execution period. If an execution period is longer than M milliseconds (e.g., M is a positive integer) estimated as normal, then there is some extra latency on the path which may lead to incomplete PLP dump, and it is considered a PLP failure;
7. Each FCPU starts PLP timer from the first message they received;
8. If HADM reaches PLP loop too late or PLP dump has started late or NAND command abort takes too long, then each FCPU detects it and activates a light core dump via ASSERT communication that exists as part of core dump flow.

In some implementations, two different detection methods can be used as illustrated in FIGS. 3 and 4 to detect the failure point at the right moment when it happens, e.g., if FW relies on only one of the timers, it would be difficult to detect the failure point, and thus it would be difficult to figure out what the cause of the issue is.

Figure 5:
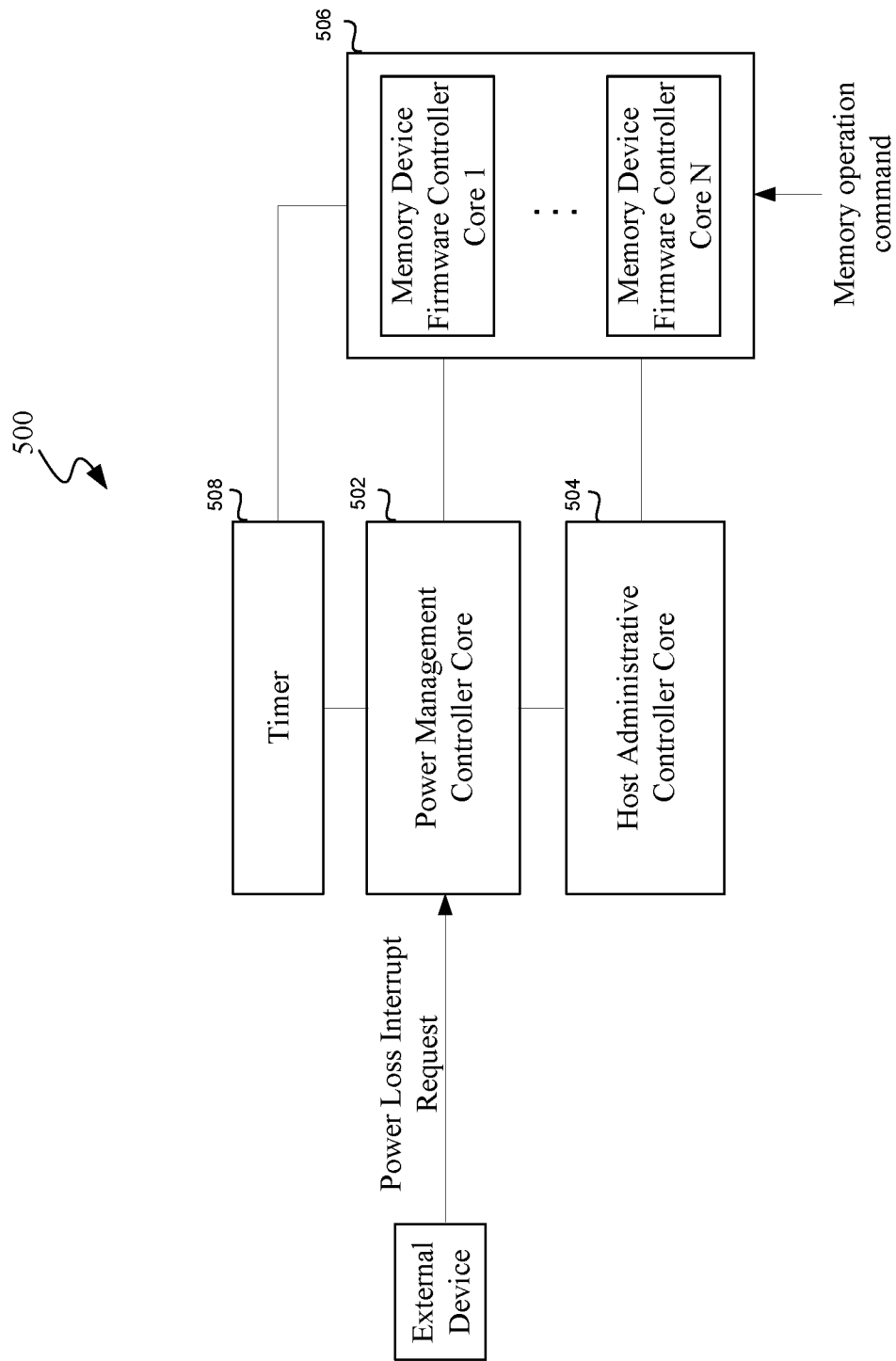
FIG. 5 illustrates an example memory system implemented based on some embodiments of the disclosed technology.

FIG. 5 illustrates an example memory system implemented based on some embodiments of the disclosed technology.

In some implementations, a memory system 500 may include a power management controller core 502, a host administrative controller core 504, a plurality of memory device firmware controller cores 506, and a timer 508.

In some implementations, the timer 508 is configured to indicate a progress of a power loss protection procedure that performs a data transfer upon occurrence of a power loss interrupt event.

In some implementations, the power management controller core 502 is in communication with the timer to initiate the timer and generate a power loss interrupt message upon occurrence of the power loss interrupt event.

In some implementations, the memory device firmware controller cores 506 are configured to perform a first data transfer operation to transfer a first amount of data to a memory device in response to the power loss interrupt message.

In some implementations, the host administrative controller core 504 continues the first data transfer operation upon an indication by the timer that the power loss protection procedure has reached a predetermined progress level. In some implementations, the host administrative controller core 504 discontinues the first data transfer operation and performs a second data transfer operation to transfer a second amount of data to the memory device upon an indication by the timer that the power loss protection procedure has failed to reach the predetermined progress level.

In some implementations, the second amount is less than the first amount.

Figure 6:
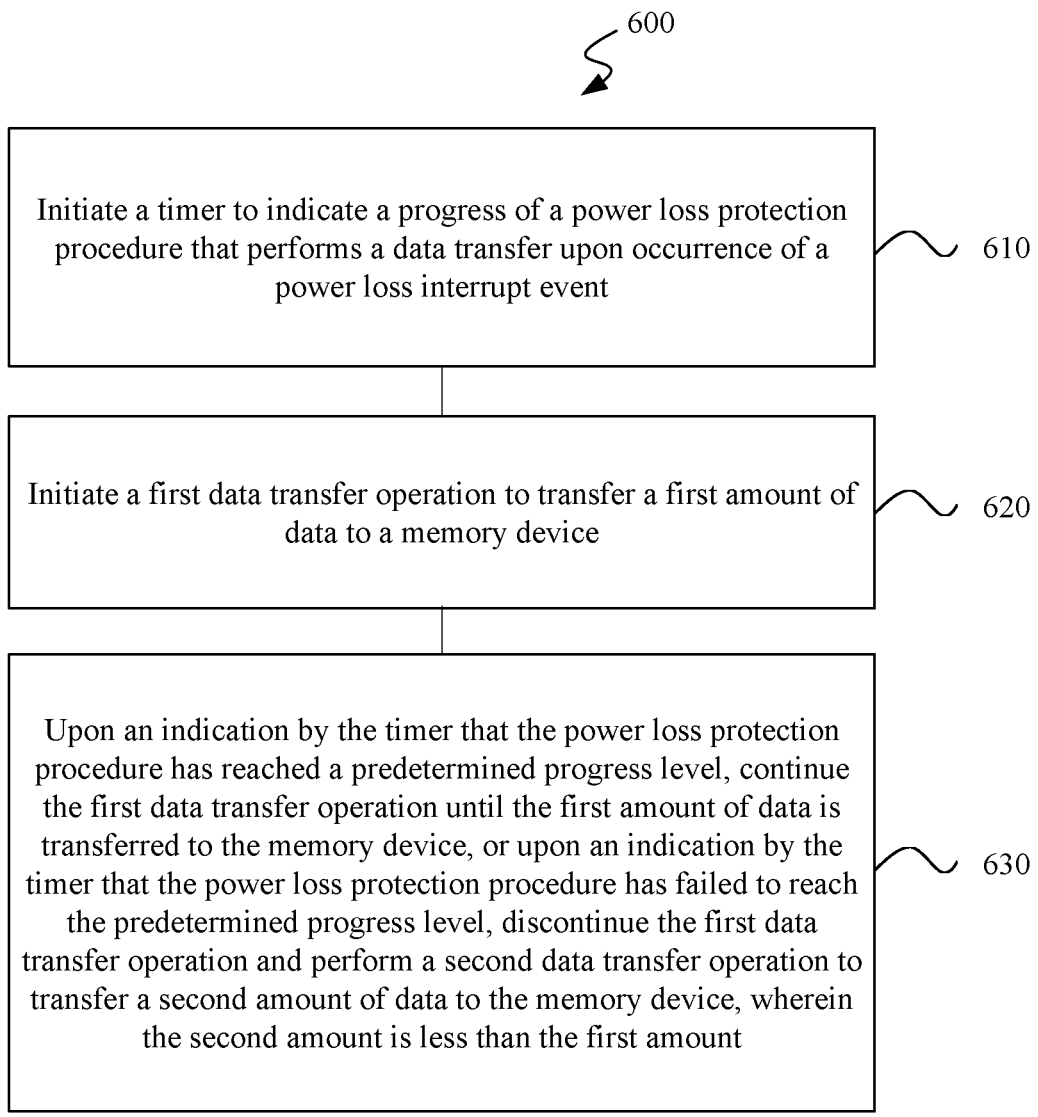
FIG. 6 is a flow diagram that illustrates an example power loss protection method based on some embodiments of the disclosed technology.

FIG. 6 is a flow diagram that illustrates an example power loss protection method based on some embodiments of the disclosed technology.

The method 600 includes, at 610, initiating a timer to indicate a progress of a power loss protection procedure that performs a data transfer upon occurrence of a power loss interrupt event, at 620, initiating a first data transfer operation to transfer a first amount of data to a memory device, and at 630, upon an indication by the timer that the power loss protection procedure has reached a predetermined progress level, continuing the first data transfer operation until the first amount of data is transferred to the memory device, or upon an indication by the timer that the power loss protection procedure has failed to reach the predetermined progress level, discontinuing the first data transfer operation and performing a second data transfer operation to transfer a second amount of data to the memory device, wherein the second amount is less than the first amount.

Therefore, various implementations of features of the disclosed technology can be made based on the above disclosure, including the examples listed below.

Example 1. A power loss protection method for a data storage device, comprising: initiating a timer to indicate a progress of a power loss protection procedure that performs a data transfer upon occurrence of a power loss interrupt event; initiating a first data transfer operation to transfer a first amount of data to a memory device; and upon an indication by the timer that the power loss protection procedure has reached a predetermined progress level, continuing the first data transfer operation until the first amount of data is transferred to the memory device, or upon an indication by the timer that the power loss protection procedure has failed to reach the predetermined progress level, discontinuing the first data transfer operation and performing a second data transfer operation to transfer a second amount of data to the memory device, wherein the second amount is less than the first amount.

Example 2. The method of example 1, further comprising receiving a power loss interrupt request upon occurrence of the power loss interrupt event to initiate the power loss protection procedure.

Example 3. The method of example 2, further comprising transmitting a message corresponding to the power loss interrupt request to one or more processors in the data storage device.

Example 4. The method of example 3, wherein the one or more processors include a host administrative controller core configured to enter a power loss interrupt loop in response to receiving the message.

Example 5. The method of example 3, wherein the one or more processors include a flash central processing unit core configured to transition a mode of firmware to a power loss protection mode in response to receiving the message.

Example 6. The method of example 1, wherein the indication that the power loss protection procedure has failed to reach the predetermined progress level includes an indication that the first data transfer operation has not started until a predetermined point in time.

Example 7. The method of example 1, wherein the indication that the power loss protection procedure has failed to reach the predetermined progress level includes an indication that an execution of a command received by the data storage device is suspended for a predetermined time period.

Example 8. The method of example 1, wherein the indication that the power loss protection procedure has failed to reach the predetermined progress level includes an indication that a timer session of the timer has expired.

Example 9. The method of example 1, wherein the indication that the power loss protection procedure has failed to reach the predetermined progress level includes an indication that one or more processors in the data storage device fails to generate a signal within a predetermined period of time.

Example 10. A data storage system, comprising: a timer configured to indicate a progress of a power loss protection procedure that performs a data transfer upon occurrence of a power loss interrupt event; a power management controller core in communication with the timer to initiate the timer and generate a power loss interrupt message upon occurrence of the power loss interrupt event; a plurality of memory device firmware controller cores configured to perform a first data transfer operation to transfer a first amount of data to a memory device in response to the power loss interrupt message; and a host administrative controller core configured to: continue the first data transfer operation in a case that the timer indicates that the power loss protection procedure has reached a predetermined progress level; or discontinue the first data transfer operation and perform a second data transfer operation to transfer a second amount of data to the memory device in a case that the timer indicates that the power loss protection procedure has failed to reach the predetermined progress level, wherein the second amount is less than the first amount.

Example 11. The system of example 10, wherein the power management controller core is further configured to receive a power loss interrupt request from an external device upon occurrence of the power loss interrupt event, wherein the power loss interrupt message is generated in response to the power loss interrupt request.

Example 12. The system of example 10, wherein the power management controller core is further configured to transmit the power loss interrupt message to the plurality of memory device firmware controller cores.

Example 13. The system of example 10, wherein the host administrative controller core is further configured to enter a power loss interrupt loop in response to receiving the message.

Example 14. The system of example 10, further comprising a flash central processing unit core configured to transition a mode of firmware to a power loss protection mode in response to receiving the message.

Example 15. The system of example 10, wherein the timer is configured to capture time stamps corresponding to the plurality of memory device firmware controller cores to indicate an elapsed time since an initiation of the power loss protection procedure.

Example 16. The system of example 10, wherein the indication that the power loss protection procedure has failed to reach the predetermined progress level includes an indication that the first data transfer operation has not started until a predetermined point in time.

Example 17. The system of example 10, wherein the indication that the power loss protection procedure has failed to reach the predetermined progress level includes an indication that an execution of a command received by the data storage device is suspended for a predetermined time period.

Example 18. The system of example 10, wherein the indication that the power loss protection procedure has failed to reach the predetermined progress level includes an indication that a timer session of the timer has expired.

Example 19. The system of example 10, wherein the indication that the power loss protection procedure has failed to reach the predetermined progress level includes an indication that one or more processors in the data storage device fails to generate a signal within a predetermined period of time.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "processor" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A power loss protection method for a data storage device, comprising:
    initiating a timer to indicate a progress of a power loss protection procedure that performs a data transfer upon occurrence of a power loss interrupt event;
    initiating a first data transfer operation to transfer a first amount of data to a memory device; and
    upon a determination that the power loss protection procedure has reached a predetermined progress level before the timer expires, continuing the first data transfer operation until the first amount of data is transferred to the memory device, and upon an expiration of the timer before the power loss protection procedure reaches the predetermined progress level, discontinuing the first data transfer operation and performing a second data transfer operation to transfer a second amount of data to the memory device, wherein the second amount is less than the first amount.

2. The method of claim 1, further comprising receiving a power loss interrupt request upon occurrence of the power loss interrupt event to initiate the power loss protection procedure.

3. The method of claim 2, further comprising transmitting a message corresponding to the power loss interrupt request to one or more processors in the data storage device.

4. The method of claim 3, wherein the one or more processors include a host administrative controller core configured to enter a power loss interrupt loop in response to receiving the message.

5. The method of claim 3, wherein the one or more processors include a flash central processing unit core configured to transition a mode of firmware to a power loss protection mode in response to receiving the message.

6. The method of claim 1, wherein the indication that the power loss protection procedure has failed to reach the predetermined progress level includes an indication that the first data transfer operation has not started until a predetermined point in time.

7. The method of claim 1, wherein the indication that the power loss protection procedure has failed to reach the predetermined progress level includes an indication that an execution of a command received by the data storage device is suspended for a predetermined time period.

8. The method of claim 1, wherein the indication that the power loss protection procedure has failed to reach the predetermined progress level includes an indication that a timer session of the timer has expired.

9. The method of claim 1, wherein the indication that the power loss protection procedure has failed to reach the predetermined progress level includes an indication that one or more processors in the data storage device fails to generate a signal within a predetermined period of time.

10. A data storage system, comprising:
    a timer configured to indicate a progress of a power loss protection procedure that performs a data transfer upon occurrence of a power loss interrupt event;
    a power management controller core in communication with the timer to initiate the timer and generate a power loss interrupt message upon occurrence of the power loss interrupt event;
    a plurality of memory device firmware controller cores configured to perform a first data transfer operation to transfer a first amount of data to a memory device in response to the power loss interrupt message; and
    a host administrative controller core configured to: continue the first data transfer operation upon a determination that the power loss protection procedure has reached a predetermined progress level before the timer expires; and discontinue the first data transfer operation and perform a second data transfer operation to transfer a second amount of data to the memory device upon an expiration of the timer before the power loss protection procedure reaches the predetermined progress level, wherein the second amount is less than the first amount.

11. The system of claim 10, wherein the power management controller core is further configured to receive a power loss interrupt request from an external device upon occurrence of the power loss interrupt event, wherein the power loss interrupt message is generated in response to the power loss interrupt request.

12. The system of claim 10, wherein the power management controller core is further configured to transmit the power loss interrupt message to the plurality of memory device firmware controller cores.

13. The system of claim 10, wherein the host administrative controller core is further configured to enter a power loss interrupt loop in response to receiving the message.

14. The system of claim 10, wherein further comprising a flash central processing unit core configured to transition a mode of firmware to a power loss protection mode in response to receiving the message.

15. The system of claim 10, wherein the timer is configured to capture time stamps corresponding to the plurality of memory device firmware controller cores to indicate an elapsed time since an initiation of the power loss protection procedure.

16. The system of claim 10, wherein the indication that the power loss protection procedure has failed to reach the predetermined progress level includes an indication that the first data transfer operation has not started until a predetermined point in time.

17. The system of claim 10, wherein the indication that the power loss protection procedure has failed to reach the predetermined progress level includes an indication that an execution of a command received by the data storage device is suspended for a predetermined time period.

18. The system of claim 10, wherein the indication that the power loss protection procedure has failed to reach the predetermined progress level includes an indication that a timer session of the timer has expired.

19. The system of claim 10, wherein the indication that the power loss protection procedure has failed to reach the predetermined progress level includes an indication that one or more processors in the data storage device fails to generate a signal within a predetermined period of time.

* * * * *